United States Patent [19]

Lord

[11] 4,215,816
[45] Aug. 5, 1980

[54] THERMALLY CONTROLLED VALVE WITH SAFETY INSPECTION FEATURE

[75] Inventor: Thomas J. Lord, Dayton, Ohio

[73] Assignee: United Aircraft Products, Inc., Dayton, Ohio

[21] Appl. No.: 876,529

[22] Filed: Feb. 9, 1978

[51] Int. Cl.² .................................................. G05D 23/12
[52] U.S. Cl. ............................... 236/99 E; 116/216; 116/DIG. 5; 137/553; 165/11 R; 236/12 R
[58] Field of Search ............... 165/11; 236/94, 99 E; 116/125, 216, DIG. 5; 137/553

[56] References Cited

U.S. PATENT DOCUMENTS

| | | | |
|---|---|---|---|
| 1,885,698 | 11/1932 | Fabbro | 236/94 X |
| 2,189,235 | 2/1940 | Wanner | 165/11 X |
| 3,467,175 | 9/1969 | O'Connor | 165/11 |
| 3,926,368 | 12/1975 | Geen | 236/94 X |
| 3,961,184 | 6/1976 | Schurrer | 250/231 R |
| 4,013,218 | 3/1977 | King | 236/94 X |
| 4,019,567 | 4/1977 | Wixson et al. | 165/11 X |
| 4,091,280 | 5/1978 | Ellis et al. | 250/231 R |

FOREIGN PATENT DOCUMENTS 7500274  7/1975  Netherlands ........................ 236/99 E

*Primary Examiner*—Albert J. Makay
*Assistant Examiner*—William E. Tapolcai, Jr.
*Attorney, Agent, or Firm*—J. E. Beringer

[57] ABSTRACT

Thermal actuating or like apparatus in which a sight conduit is comprised in a valve housing enabling the changing position of a thermal actuator within the housing to be observed from outside the housing. A fiber optic device acts as the sight conduit and provides for a display externally of the housing of color coded or like markings on the actuator. In one aspect thereof, the invention makes possible a substantially continuous comparison of the operations of redundant actuators so that an operator or user of the apparatus may be alerted to failure of one of the actuator units.

9 Claims, 8 Drawing Figures

THERMALLY CONTROLLED VALVE WITH SAFETY INSPECTION FEATURE

BACKGROUND OF THE INVENTION

Temperature responsive by-pass and like control valves frequently comprise a housing formed with fluid flow apertures and containing one or more valve elements settable to control fluid flow through the housing. One or more power type thermal actuators are in the housing, and, responsive to changing fluid temperature, effect positive movements of the valve element or elements to different control positions. Power type thermal actuators are known in the art and are known to have a high degree of reliability. Nevertheless, they do sometimes fail in use. Failure may be evidenced by an inability properly to project a movable part, or may be evidenced by a complete inability to operate. In either event, corresponding failure of the valve to perform its intended purpose results.

In instances where the probability of valve failure must be reduced to a minimum, it has been proposed to construct the valve with duplicate or redundant thermal actuators. The plural actuators would operate in unison with one another on the same valve element or elements. Should one thereof fail, another would remain in service and be capable of effecting all necessary valve operations. Problems exist in incorporating redundant units in a valve structure so that they are equally responsive to fluid temperature change. Also, should one of the thermal actuators fail, there is nothing to give warning that failure has occurred since the remaining thermal actuator continues a normal valve operation. At any given time in the operation of a fluid flowing system, therefore, there can be no assurance that the protection afforded by redundant thermal actuators does in fact prevail. Nor in a pre-use check out of a system can it be determined that a redundant thermal actuator is operating improperly or not at all.

Insofar as is known, the prior art contains no teaching of methods or apparatus providing for effective use of redundant thermal actuators, and no means to carry out safety inspections in connection with either single or redundant actuators.

SUMMARY OF THE INVENTION

The instant invention, in aspects thereof relating generally to a use of redundant thermal actuators, provides for a pair of actuators to be closely received in a side by side relation in a housing chamber. Flow apertures to and from the chamber are arranged to insure that both actuators are affected substantially equally by changes in temperature of the flowing fluid. Projecting work engaging parts of the actuators are extensible therefrom under conditions of rising fluid temperature and are in common engagement with a positionable valve element controlling a fluid flow aperture or apertures. Optical or sight conduits are installed to present opposite ends which are respectively inside and outside the housing. Inner or sighting ends are fixed in an adjacent relation to respective movable work engaging parts of the actuators. Outer or viewing ends are located outside the housing at a convenient viewing location. As the work engaging parts move relatively to fixed inner ends of the sight conduits, markings thereon, for example color coded bands, move across sighting ends of the conduits and a display of the images "seen" appears at viewing ends of the conduits. By a comparison of displayed images, it may be quickly and easily determined whether both actuators are operable and whether both are operating with the same response to temperature change. Operability of a single actuator may be verified by reference to a monitoring thermally sensitive means, using a pair of sight conduits. The sight conduit may conveniently take the form of a fiber conduit in which a flexible bundle of optical fibers is adapted for the transmission of light and images.

An object of the invention is to provide thermally responsive apparatus characterized substantially as in the foregoing. It will be understood in this connection that although the invention is disclosed as applied to a thermally responsive by-pass control valve or the like, it is more generally applicable to situations in which operational positions of relatively inaccessible parts are required to be verified or compared.

Other objects and structural details of the invention will appear from the following description, when read in connection with the accompanying drawings, wherein.

Figure 1:
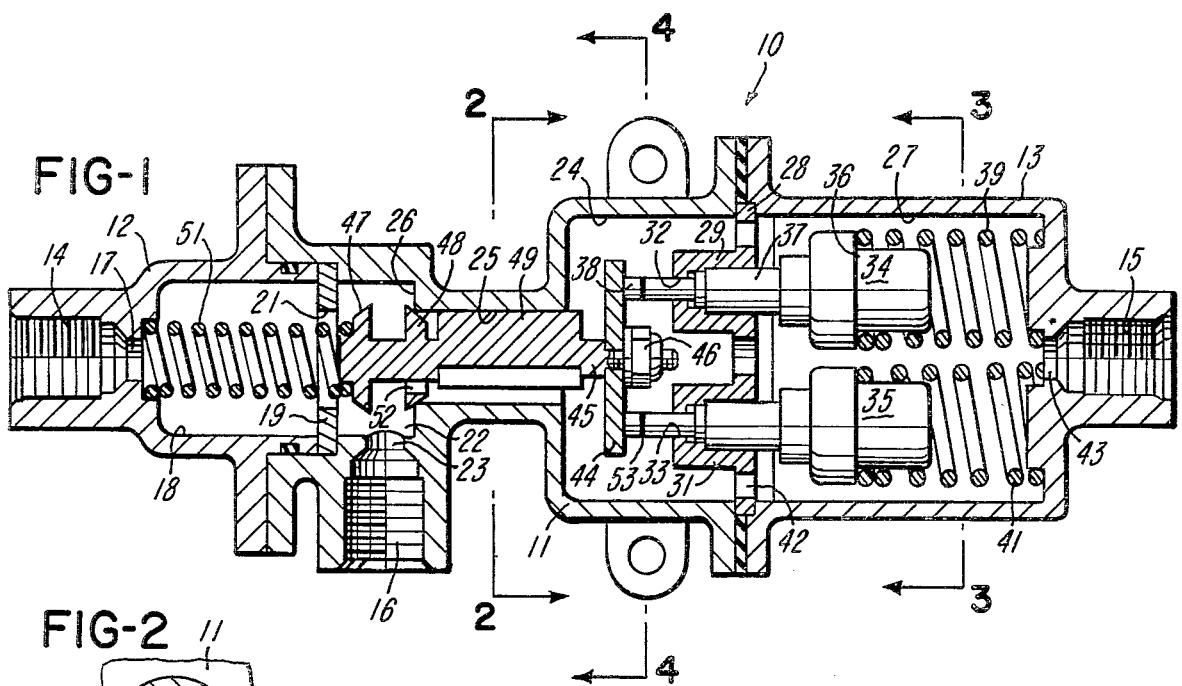
FIG. 1 is a view in longitudinal section of a by-pass or like control valve having redundant thermal actuators and safety inspection features according to the illustrated embodiment of the invention.
Figure 2:
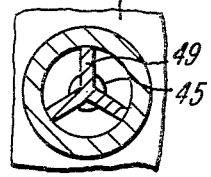
FIG. 2 is a view in cross section, taken substantially along the line 2—2 of FIG. 1.

Referring to the drawings, apparatus according to an illustrated embodiment of the invention includes a valve housing 10 comprised of a central body portion 11 and end body portions 12 and 13. Portions 12 and 13 are applied in closing relation to opposite ends of portion 11, and mating parts have mating flanges bolted together to form a unitary housing structure. At its opposite ends, the valve housing 10 has inlets 14 and 15 for first and second fluids, and, at an intermediate location, has a single fluid outlet 16. Fluid inlet 14 communicates through a body opening 17 with an expanded interior housing chamber 18. The body portion 12 is received within a counterbore in central body portion 11 and cooperates in the fixing of a valve seat 19, the latter having a through central opening 21. The arrangement places chamber 18 to one side of the valve seat 19 and forms to the other side of the valve seat a chamber 22 communicating through an opening 23 with outlet 16.

The central body portion 11 is relatively expanded at one end to form the chamber 22. It is similarly expanded at its opposite end to form a chamber 24, and, intermediate the expanded portions has a reduced diameter waist portion in which is a through passage 25. Where the waist portion of body 11 expands to form chamber 22, it defines a valve seat 26. Passage 25 opens at one end through the valve seat 26 into chamber 22. At its opposite end, passage 25 similarly opens into expanded chamber 24.

Figure 3:
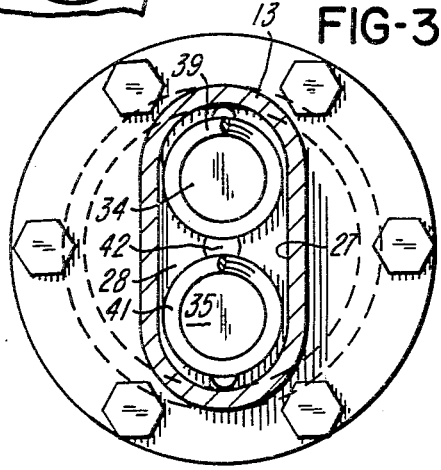
FIG. 3 is a view in cross section, taken substantially along the line 3—3 of FIG. 1.

Chamber 24 is substantially circular in cross section. Body portion 13 has a circular flange portion in mating engagement with a flange on body portion 11 but in projecting rearwardly or outwardly therefrom has a reduced, substantially oval-like configuration substantially as indicated in FIG. 3. The arrangement provides a longitudinally elongated laterally flattened chamber 27. Fixed by being mounted between flange portions 11 and 13 is a bearing and flow distributor plate 28. The plate 28 has a pair of vertically spaced apart recessed pockets 29 and 31 having respective apertures 32 and 33 in bottom wall portions thereof. Situated within the chamber 27 are vertically spaced apart thermal actuators 34 and 35. The actuators 34 and 35 are thermal power elements of a kind known in the art and will not be here described in detail. Within a case portion 36 thereof an amorphous, waxlike material is confined, expanding relatively powerfully under the influence of a sensed rising temperatures. A sleeve 37 of the actuator case has a bearing mounting in respective pockets 29 and 31 and provides a sliding mount for a relatively extensible stub shaft 38. The shaft 38 of each power actuator projects through and beyond respective openings 32 and 33 in the bearing plate pockets. Within chamber 27, the thermal actuator 34 seats to and is in part supported by a compression spring 39 based in the closed end of body portion 13. Actuator 35 similarly engages with a compression spring 41 similarly seated in the closed end of the portion 13. Under the urging of springs 39 and 41, the thermal actuators occupy normally a substantially fixed position in which sleeve portions 37 seat to counterbores within respective pockets 29 and 31.

The bearing plate 28 positions between and separates housing chambers 24 and 27. A series of apertures 42 are appropriately located within the bearing plate and define flow passes whereby fluid in chamber 27 may pass to chamber 24 in well defined streams occurring in upper and lower and mid portions of the chambers. Fluid flow into the chamber 27 is from inlet 15 by way of an opening 43. In flowing through the chamber 27, the fluid is constrained by the location of apertures 42 to pass into thorough and substantially equal contact with the power actuators 34 and 35 so that the actuators are able directly and substantially equally to sense changing temperatures of the flowing fluid.

The extensible stub shafts 38 have end abutting engagement with a plate 44 fixed to a valve shaft 45, as by being made fast thereon by a nut 46. Valve shaft 45 positions longitudinally of passage 25 and has opposite ends projecting respectively into chambers 22 and 24. The end projecting into chamber 24 has plate 44 thereon. The end projecting into chamber 22 has integrally formed thereon longitudinally spaced frustoconical valve elements 47 and 48. The valve elements project oppositely of one another and are adapted respectively to engage valve seats 19 and 26 to close and open the flow passes defined therethrough by opening 21 and the adjacent end of passage 25. The valve elements are spaced apart a distance less than the spacing between valve seats 19 and 26 so that a longitudinal position of adjustment of valve shaft 45 which causes valve element 48 to position within and engage seat 26 opens the flow path through valve seat 19, and vice versa. The valve shaft 45 has a sliding bearing in passage 25 by virtue of a three-part vane 49 which while providing for a sliding mount of the valve shaft in the passage does not obstruct fluid flow therethrough. The valve shaft and related parts is urged in an axial direction toward the thermal actuators 34 and 35, or to the right as viewed in FIG. 1, by a compression spring 51 based in a closed end of body portion 12 and extending through valve seat opening 21 to engage valve element 47. Spring 51 has a strength sufficient to recompress cooling wax material in actuators 34 and 35 but lesser in strength than springs 39 and 41.

In the operation of the valve apparatus, first and second fluids are admitted under pressure to inlets 14 and 15 respectively, with adjustments in the position of valves 47 and 48 being made responsively to changes in the temperature of the fluid admitted to inlet 15. Systems in which a valve substantially as disclosed may usefully be employed may be variously comprised and serve various purposes. For purposes of the present disclosure it will be sufficient to consider that the fluid admitted to the valve housing by way of inlet 14 is a relatively cool fluid of substantially constant temperature whereas the fluid admitted to the housing by way of inlet 15 is a relatively hot fluid of changing temperature. It may be regarded as an object of the valve structure to obtain an outflow from housing outlet 16 in which the fluid comprised in such outflow does not exceed a predetermined high temperature value. The apparatus operates, in this connection, variably to adjust valves 47–48 so that all of the fluid supplied outlet 16 comes from inlet 14 or from inlet 15 or is constituted by a mixture of the two fluids.

The apparatus may be regarded as occupying normally a position substantially as illustrated in FIG. 1 wherein valve 48 occupies a closed position on seat 26 while valve 47 occupies an open position relatively to valve seat 19 and opening 21 therein. Flow at this time occurs substantially exclusively from inlet 14 through chamber 18 and through opening 21 to chamber 22 where the flowing fluid has direct access through opening 23 to outlet 16. Flow from inlet 15 to outlet 16 is blocked by valve 48 in positioning within seat 26. In this connection, valve 48 has a small diameter opening 52 in accordance with which at least a trickle of fluid supplied inlet 15 may at all times pass through the valve housing to outlet 16. The thermal actuators 34 and 35 accordingly are at all times subject to the influence of a flowing fluid. As the fluid flowing through chamber 27 around actuators 34 and 35 increases in temperature, the contained wax-like material therein expands. Under such expansion influences, the stub shafts 38 are relatively extended. Extending motion of the actuator shafts is effective through plate 44 axially to extend shaft 45 and to unseat valve 48. Flow in increased volume commences through chamber 27 and through the passage 25 to outlet 16, and, if such extending motion of the valve shaft continues a sufficient distance to seat valve 47 within opening 21, flow from inlet 15 to outlet 16 will occur exclusively of fluid admitted to inlet 14. If the temperature of the fluid admitted through inlet 15 drops, expanding influences acting upon the wax-like material in actuators 34 and 35 ceases. Spring 51, which has been additionally compressed by an axial motion of the valve 47 within opening 21, is permitted to return the valve shaft toward a starting position as shown in FIG. 1. This pressure is applied through the valve shaft and through plate 44 to stub shafts 38 and results in a recompression of the wax-like material in the thermal actuators. Under opposing influences of the thermal actuators and of spring 51, the valve assembly is variably positioned in a longitudinal sense to allow full flow to the outlet 16 from inlet 14 or from inlet 15 or to allow a mixture of the two flows to reach outlet 16, all in accordance with a changing temperature of the fluid admitted to inlet 15 as sensed by the thermal actuators.

Figure 4:
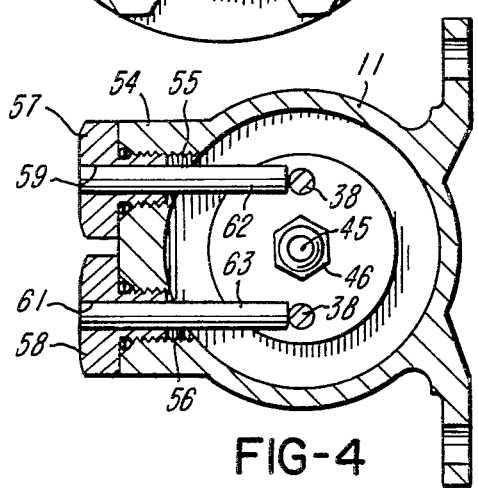
FIG. 4 is a view in cross section, taken substantially along the line 4—4 of FIG. 1.
Figure 8:
FIG. 8 is a view in cross section of a fiber optic device.

Movement of the valve shaft in response to rising fluid temperature is a function of extension of the shafts 38 by the respective thermal actuators. It will be understood in this connection that the thermal actuators are redundant in that either can effectively operate the valve shaft independently of the other. Thus, should one of the actuators fail, uninterrupted valve operation would continue by virtue of the expanding and contracting movements of the other. In accordance with the instant invention, and in order that warning may be given of failure of one of the thermal actuators, the extensible stub shafts 38 each are marked with a black or otherwise colored band 53. The band 53 is located in a sense intermediately of the outer extremity of the stub shaft and an adjacent end of the pocket 29 or 31. The band or marking location is the same on each shaft. As shown in FIG. 4, the body portion 11 has an external flange portion 54 in which are threaded apertures 55 and 56 locating in a sense substantially perpendicular to respective stub shafts 38. A plug 57 has a threaded mounting in aperture 55 and a like plug 58 has a threaded mounting in aperture 56. In the respective plugs are longitudinal through passages 59 and 61. Installed in the respective passages 59 and 61 are sight conduits 62 and 63. The conduits 62 and 63 are in the illustrated instance fiber optic devices and as such it is not considered that they are required to be here disclosed in detail. Each may comprise, as indicated in FIG. 8, a sheath 64 enclosing a bundle of plastic, optical fibers 65. The arrangement is one in which the defined sight conduit is capable of transmitting light and images from end to end thereof. What may be regarded as viewing ends of the sight conduits are presented in a side by side relation outside the housing while inner or sighting ends extend into an adjacent, substantially touching relation to external surfaces of the stub shafts 38. Viewable portions of the stub shaft exteriors, including marking bands 53, accordingly are displayed at outer viewing ends of the sight conduits. The sight conduits 62 and 63 are substantially sealed in respective passages 59 and 61 to preclude an escape of pressure fluid from chamber 24.

Figure 5:
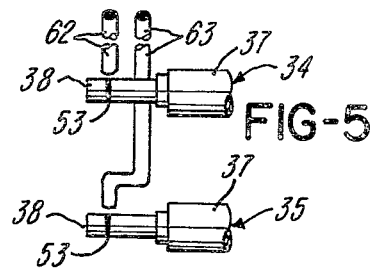
FIG. 5 is a diagram indicating a normal operational position of thermal actuators.
Figure 6:
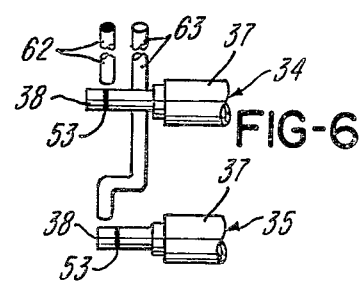
FIG. 6 is a view like FIG. 5, wherein one of the thermal actuators is in a failed position.

A diagrammatic illustration of what may be regarded as a normal operating position of the parts appears in FIG. 5. As there shown, the thermal actuators 34 and 35 have responded to rising fluid temperatures by extending stub shafts 38 from positions as shown in FIG. 1 to a position readjusting valves 47–48 relatively to their seats 19 and 26. In this instance, therefore, marked areas 53 of both stub shafts have moved into line with sighting ends of the sight conduits and the dark or colored areas as represented by the bands 53 are similarly represented as dark or colored images at viewing ends of the conduits. FIG. 5 accordingly illustrates an operational position in which both actuators are operating normally. In FIG. 6, failure of thermal actuator 35 has been assumed. In this instance, stub shaft 38 associated with actuator 34 has moved outward in response to rising fluid temperatures and the image of marking 53 appears at the viewing end of conduit 62. In the case of actuator 35, however, stub shaft 38 has not extended and marking 53 has not moved into line with the sighting end of conduit 63. The viewing end of conduit 63 accordingly shows no image of a marking band. A simple comparison of the images displayed at viewing ends of the sight conduits accordingly evidences the fact that one of the thermal actuators has failed and the failed actuator is, moreover, positively identified.

The sight conduits 62 and 63 have been illustrated as terminating immediately outside the valve housing. It will be understood, however, and in accordance with flexibility characteristics of fiber optics, that the conduits could be extended to a relatively remote viewing station if that should be found more convenient.

Figure 7:
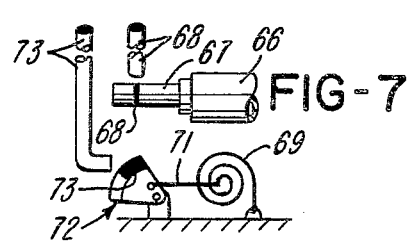
FIG. 7 is a diagram of an inspection system in which operational positions of a single thermal actuator can be compared to those of a control indicator.

FIG. 7 illustrates another form of the invention in which a thermal actuator 66 projects a stub shaft 67 having a marking band 68 thereon. A sight conduit 68 is arranged to "read" movement of the stub shaft 67 and to display the image of band 68 at its viewing end when the stub shaft has aligned the band with the sighting end of the conduit. In this instance, a bi-metal thermostat 69 is located in the same housing with actuator 66 to be contacted by the same flowing fluid. In a valve housing such as is indicated in FIG. 1, for example, actuator 66 would correspond to thermal actuator 34 while bi-metal thermostat 69 would be located in chamber 27 in lieu of or in replacement for thermal actuator 35. A link 71 connects thermostat 69 to an oscillatory indicator or flag device 72 a portion of which has a marking 73 corresponding to the marking band 68 on stub shaft 67. Thermostat 69 operates in unison with extending and retracting movements of stub shaft 67 and effects rocking movements of indicator 72. A sight conduit 73 corresponding substantially to sight conduit 63 of the first considered embodiment has a sighting end positioned to "read" the face of indicator 72. A viewing end of conduit 73 is located in an adjoining relation to the viewing end of conduit 68 so that both are readily available for comparison of display images. As will be understood, thermostat 69 and indicator 72 perform a monitoring function. If the display at the viewing end of conduit 68 does not match the display at the viewing end of conduit 73, it may be assumed that thermal actuator 66 has failed. The thermal actuators have relatively extended ranges of motion. A plurality of differently colored bands may be placed thereon so that response of the actuators at different temperature values may be seen and compared.

In general, when images observed through the sight conduits agree, it may be assumed that each of a pair or all of multiple thermal actuators are responding properly to changes in fluid temperature. When observed images disagree, an assumption of failure may be made.

What is claimed is:

1. A valve including fluid control means and redundant thermal actuators therefor, said thermal actuators each having a part movable in response to sensed changes in fluid temperature, a housing commonly enclosing said thermal actuators and providing for fluid flow therethrough in simultaneous contact with said thermal actuators, and sighting conduits extending from the exterior of said housing to the interior thereof and each providing a sighting end within the housing and a viewing end outside the housing, the said sighting end of each of said conduits being fixed in said housing in an adjacent relation to a respective movable part and each of said movable parts having viewable portions thereon which as seen through respective sight conduits identify operational positions of said actuators the viewing ends of said sight conduits being presented for convenient comparison of images seen.

2. A valve according to claim 1, the viewable portions on said movable part being code markings each corresponding to an operational position of the actuating means.

3. A valve according to claim 1, each of said sight conduits being a fiber optic device.

4. A valve according to claim 1, the movable parts of said actuators having substantially like markings at corresponding locations thereon for a visual comparison of the relative movements thereof.

5. A valve according to claim 4, said thermal actuators being in a side by side relation to one another and said movable parts projecting from ends thereof, said parts being extensible and retractable relatively to their respective actuators and a differential position of said markings on said parts as seen through said sight conduits indicating an extension or retraction of one thereof relatively to the other.

6. A valve according to claim 5, said housing having a chamber commonly accommodating said thermal actuators therein, and there being a fluid inlet to and a fluid outlet from said chamber, said thermal actuators positioning to be influenced substantially equally by changing temperatures of the fluid flowing through said chamber.

7. A valve according to claim 1, the movable parts being color coded, colors being displayed at the viewing end of said sight conduits for comparison.

8. A valve including fluid flow control means and a thermal actuator therefor, said thermal actuator having a part movable in response to sensed changes in fluid temperature, a thermally responsive monitor having a part movable in response to sensed changes in fluid temperature, said thermal actuator and said thermally responsive monitor having corresponding viewable portions thereon, a housing commonly enclosing said thermal actuator and said thermally responsive monitor providing for fluid flow therethrough in simultaneous contact with said thermal actuator and with said thermally responsive monitor, sight conduit means providing a sighting end within the housing and a viewing end outside the housing, said conduit means comprising a pair of sight conduits one having its sighting end extending to an adjacent relation to a movable part of said thermal actuator and the other having its sighting end extending to a movable part of said thermally responsive monitor, the viewing ends of said sight conduits being presented for convenient comparison of images seen.

9. A valve according to claim 8, said thermally responsive monitor including a device expansible and retractable responsively to fluid temperature change, and a flag device connected to be moved by said temperature responsive device.

* * * * *